(12) United States Patent
Moore et al.

(10) Patent No.: US 10,979,407 B2
(45) Date of Patent: Apr. 13, 2021

(54) DATA COMMUNICATIONS

(71) Applicant: Sony Corporation, Tokyo (JP)

(72) Inventors: Nigel Stuart Moore, Newbury (GB); Huw Hopkins, Basingstoke (GB)

(73) Assignee: Sony Corporation, Tokyo (JP)

( * ) Notice: Subject to any disclaimer, the term of this patent is extended or adjusted under 35 U.S.C. 154(b) by 148 days.

(21) Appl. No.: 16/309,353

(22) PCT Filed: Jun. 20, 2017

(86) PCT No.: PCT/GB2017/051792
§ 371 (c)(1),
(2) Date: Dec. 12, 2018

(87) PCT Pub. No.: WO2017/220986
PCT Pub. Date: Dec. 28, 2017

(65) Prior Publication Data
US 2019/0260719 A1 Aug. 22, 2019

(30) Foreign Application Priority Data
Jun. 24, 2016 (GB) .................................... 1611032

(51) Int. Cl.
*H04L 29/06* (2006.01)

(52) U.S. Cl.
CPC ........ *H04L 63/0478* (2013.01); *H04L 63/045* (2013.01); *H04L 63/0414* (2013.01); *H04L 63/0823* (2013.01); *H04L 63/166* (2013.01); *H04L 63/061* (2013.01)

(58) Field of Classification Search
CPC ..... G06F 21/42; G06F 21/43; H04L 63/0853; H04L 63/18; H04L 63/0478; H04L 63/0414; H04L 63/045; H04L 63/0823; H04L 63/166; H04L 63/061
See application file for complete search history.

(56) References Cited

U.S. PATENT DOCUMENTS

| 7,661,131 B1 | 2/2010 | Shaw et al. | |
|---|---|---|---|
| 2005/0050317 A1* | 3/2005 | Kramer | G06F 21/606 713/155 |

(Continued)

OTHER PUBLICATIONS

International Search Report and Written Opinion dated Aug. 7, 2017 in PCT/GB2017/051792 filed on Jun. 20, 2017.

(Continued)

*Primary Examiner* — Malcolm Cribbs
(74) *Attorney, Agent, or Firm* — Oblon, McClelland, Maier & Neustadt, L.L.P.

(57) ABSTRACT

A communications system comprises a client device and a server device; the server device comprising server communication circuitry configured to establish a server-authenticated first encrypted data path between the client device and the server device; and the client device comprising client communication circuitry configured to provide client-specific information to the server device using the first encrypted data path; the server communication circuitry being configured to use the client-specific information provided by the client device to establish a second encrypted data path between the server device and the client device, the second encrypted data path being authenticated by at least the client device.

14 Claims, 5 Drawing Sheets

(56) References Cited

U.S. PATENT DOCUMENTS

| | | | |
|---|---|---|---|
| 2007/0286365 A1* | 12/2007 | Busser | H04L 63/0823 |
| | | | 379/93.02 |
| 2009/0327698 A1* | 12/2009 | Baker | H04N 21/6581 |
| | | | 713/153 |
| 2011/0231649 A1* | 9/2011 | Bollay | H04L 67/14 |
| | | | 713/151 |
| 2013/0152180 A1* | 6/2013 | Nair | H04L 63/0823 |
| | | | 726/6 |
| 2013/0198511 A1 | 8/2013 | Yoo et al. | |
| 2014/0282957 A1 | 9/2014 | Thakore et al. | |
| 2016/0087973 A1 | 3/2016 | Thakore et al. | |
| 2016/0099922 A1* | 4/2016 | Dover | G06F 21/575 |
| | | | 713/171 |
| 2017/0272470 A1* | 9/2017 | Gundamaraju | H04L 12/1407 |

OTHER PUBLICATIONS

Menezes, A. J. et al., "Handbook of Applied Cryptography", 1997, CRC Press LLC, pp. 506-515.

Santesson, S., "TLS Handshake Message for Supplemental Data", Sep. 2006, 10 pages. URL: https://tools.ietf.org/html/rfc4680.

* cited by examiner

DATA COMMUNICATIONS

CROSS REFERENCE TO RELATED APPLICATIONS

The present application claims the benefit of the earlier filing date of GB1611032.2 filed in the United Kingdom Intellectual Property Office on 24 Jun. 2016, the entire contents of which application are incorporated herein by reference.

BACKGROUND

Field

This disclosure relates to data communications.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

In example data communications systems, secure connections are established between devices (such as client devices and server devices) to provide for the exchange of secure information. An example is the provision by a server of a secure decryption key as part of a digital rights management content delivery system.

SUMMARY

The present disclosure addresses or mitigates problems arising from this processing.

Respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
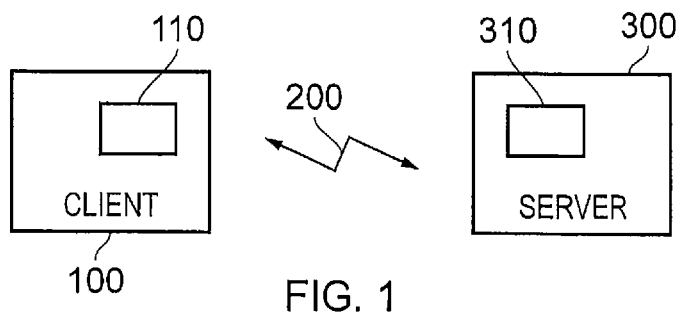
FIG. 1 schematically illustrates a communications system.

FIG. 1 schematically illustrates a communications system comprising a client device 100 (which may be one of multiple client devices—any others not being shown) connectible via a communication link 200 to a server device 300. The client device comprises (amongst other features—not shown for clarity of FIG. 1) client communication circuitry 110 configured to communicate with the server device, and the server device comprises (again, amongst other features which are not shown for clarity of FIG. 1) server communication circuitry 310 configured to communicate with one or more client devices.

As discussed in more detail below, the client device 100 is configured to communicate with a server device and comprises communication circuitry 110 configured to initiate establishment of a server-authenticated first encrypted data path between the client device and the server device to provide client-specific information to the server device using the first encrypted data path to initiate establishment of a second encrypted data path between the server device and the client device, the second encrypted data path being authenticated by at least the client device.

As discussed in more detail below, the server device 300 is configured to communicate with a client device and comprises communication circuitry 310 configured to establish a server-authenticated first encrypted data path between the client device and the server device, and to receive client-specific information from the client device using the first encrypted data path; the communication circuitry being configured to use the client-specific information provided by the client device to establish a second encrypted data path between the server device and the client device, the second encrypted data path being authenticated by at least the client device.

Figure 2:
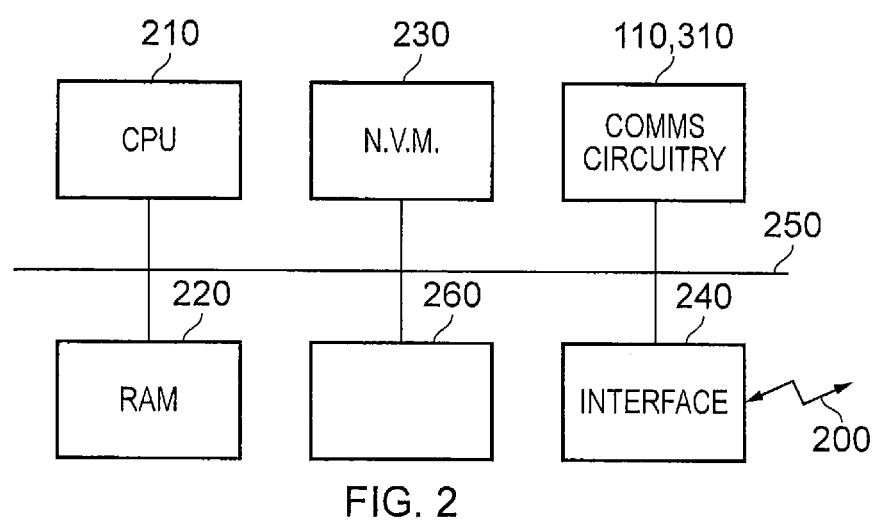
FIG. 2 schematically illustrates a client device or a server device.

FIG. 2 schematically illustrates a client device or a server device. In these examples, in many respects the client device and the server device may have a similar functional structure apart from differences which will be identified below. Therefore, in the present description, a data processing system applicable for use as either the client device or the server device is described, with the differences between the two being identified.

In the examples, the device comprises a processor (central processing unit or CPU) 210, a random access memory (RAM) 220, a non-volatile memory (NVM) 230 such as read only memory (ROM), a hard disk device or the like, communication circuitry 110, 310 (as the case may be) as discussed above and a data interface 240 for providing data communication via the link 200. All of these functional units may be connected together by a bus or interconnect structure 250. Further functionality shown schematically as a functional unit 260 may be provided which is specific to either the client device or the server device. Examples of such additional functionality include: at the server device, the provision of a decryption key and the provision of encrypted content to a client device, or at the client device, the requesting of a decryption key and the decryption of encrypted content supplied by the server device. Operations which are specific to a client device or a server device in the examples below will be described in more detail below and may be carried out, for example, by the CPU 210 (for example under software control) and/or by the functional unit shown schematically as the box 260.

An example arrangement involves the client device decrypting content such as audio and/or visual content, supplied to the client device in encrypted form by the server device. For example, the client device may be a media or content player capable of playing content streamed from the server device according to an encryption scheme provided by a digital rights management (DRM) arrangement. An overview of such an arrangement will be discussed with reference to FIG. 3.

Figure 3:
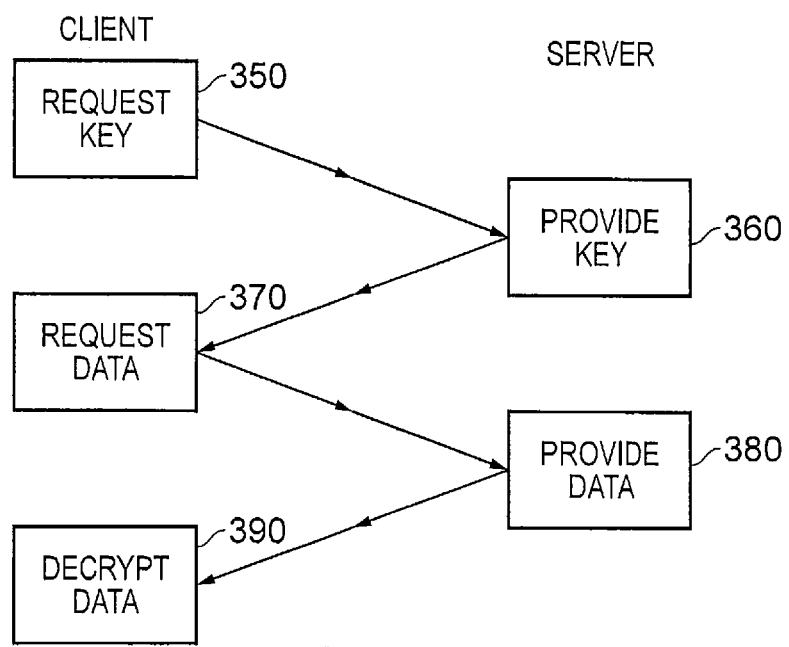
FIG. 3 is a schematic flowchart illustrating a key and data acquisition process.

FIG. 3 is a schematic flowchart illustrating a key and data acquisition process. In FIG. 3, operations carried out by a client device are shown in a left column of the flowchart, and operations carried out by a server device are shown in a right column of the flowchart.

At an overview level, when a client device wishes to replay content protected under the DRM scheme (for example, in response to a command provided by a user) the client device requests a decryption key at a step 350 from the server device. At a step 360 the server device provides the key to the requesting client device. Then at a step 370 the client device requests the data corresponding to the content to be replayed. At a step 380 the server device provides the data in an encrypted form which is capable of being decrypted using the key provided at the step 360. Finally, at a step 390 the client device decrypts the data provided by the server device.

It will be appreciated that the key needs to be provided by the server device to the client device (at the step 360) in a secure fashion in order to prevent unauthorised use, for example by eavesdropping devices, of the key to decrypt the content data. In contrast, the data itself (provided at the step 380) need not be carried over a secure link because the data itself is already encrypted. Therefore, in examples, the client device and the server device cooperate to establish a secure link to allow the provision of the key at the step 360 to be carried out. Once the key has been provided, the secure link can be closed because, as discussed above, secure transmission is not required for the encrypted content data itself.

A technique for establishing a secure link is the so-called Transport Layer Security (TLS) system, a development of the so-called Secure Socket Layer (SSL) system. Under this system, a secure link can be established by so-called server authentication, by so-called client authentication or by so-called mutual authentication. A TLS interaction can involve multiple successive steps. These can include:

- the client device initiating interaction by a so-called "TLS hello" message
- the server device responding by a TLS hello message
- the server device sending server-specific information (such as a server certificate) to the client device
- the server device and the client device carrying out a key exchange process (such as a so-called Diffie-Helman process)
- in the case of client or mutual authentication but not in the case of server authentication, the server device requesting client-specific information (such as a client certificate) from the client and the client device providing such information
- handshaking to confirm the establishment of a secure TLS connection
- once the secure connection has started, the client device or the server device can use (for example) an http (hypertext transfer protocol) "get" message over the secure TLS connection to request secure information from the other device.

In general, server authentication is where the server is verified as authentic to the client, client authentication is where the client is verified as authentic to the server and mutual authentication is where the client and the server are both verified as authentic to each other.

Server authentication does not require any secure client-specific information to be sent to the server, but the corollary of this is that server authentication does not involve fully identifying the client device. Server authentication alone is therefore considered to be an unsuitable method for providing a secure link to pass a decryption key at the step 360, because it does not involve adequately confirming the identity of the client to which the decryption key is being passed. However, other issues may be experienced with mutual or client authentication, both of which involve the client device passing client-specific information such as a client certificate to the server device as part of the authentication process associated with setting up the secure TLS data link. If such client-specific information is passed to the server device during the authentication process over an insecure link (because, at that stage, the secure link has not yet been established) this could in principle compromise the privacy of the client device. In embodiments, the client-specific information could be a serial number or some other identifier or identification string allocated to a device. It could be allocated to a device by subscription to a service. In embodiments, the client-specific information could be a "Subject" or "Subject Public Key Info" and the "X509 Subject Key Identifier" in the sense of the X509v3 standard for digital certificates. In some embodiments the client-specific information is derived from information stored in association with the client or a peripheral device in a persistent electronic memory. In some embodiments client-specific information is part of an identifier or identification string. It may be combined (for example concatenated or hashed or otherwise delivered in association) with other information, for example time and/or date information or other certificate information stored in data fields associated with the certificate. Time and/or date information may be obtained from a time server. In some embodiments, the time information may be the start and or the end time of the validity of a certificate which may be stored in specific fields. In general, the certificate shouldn't be used outside of its valid from and valid until periods. The client information may be quasi unique and assembled from device parameters such as software versions (browser, operating system (OS), plugins, extensions, etc.) and for example current time and optionally certificate validity times and/or hardware parameters. This can be said to form a fingerprint which could identify one or a small number of users/devices.

Figure 4:
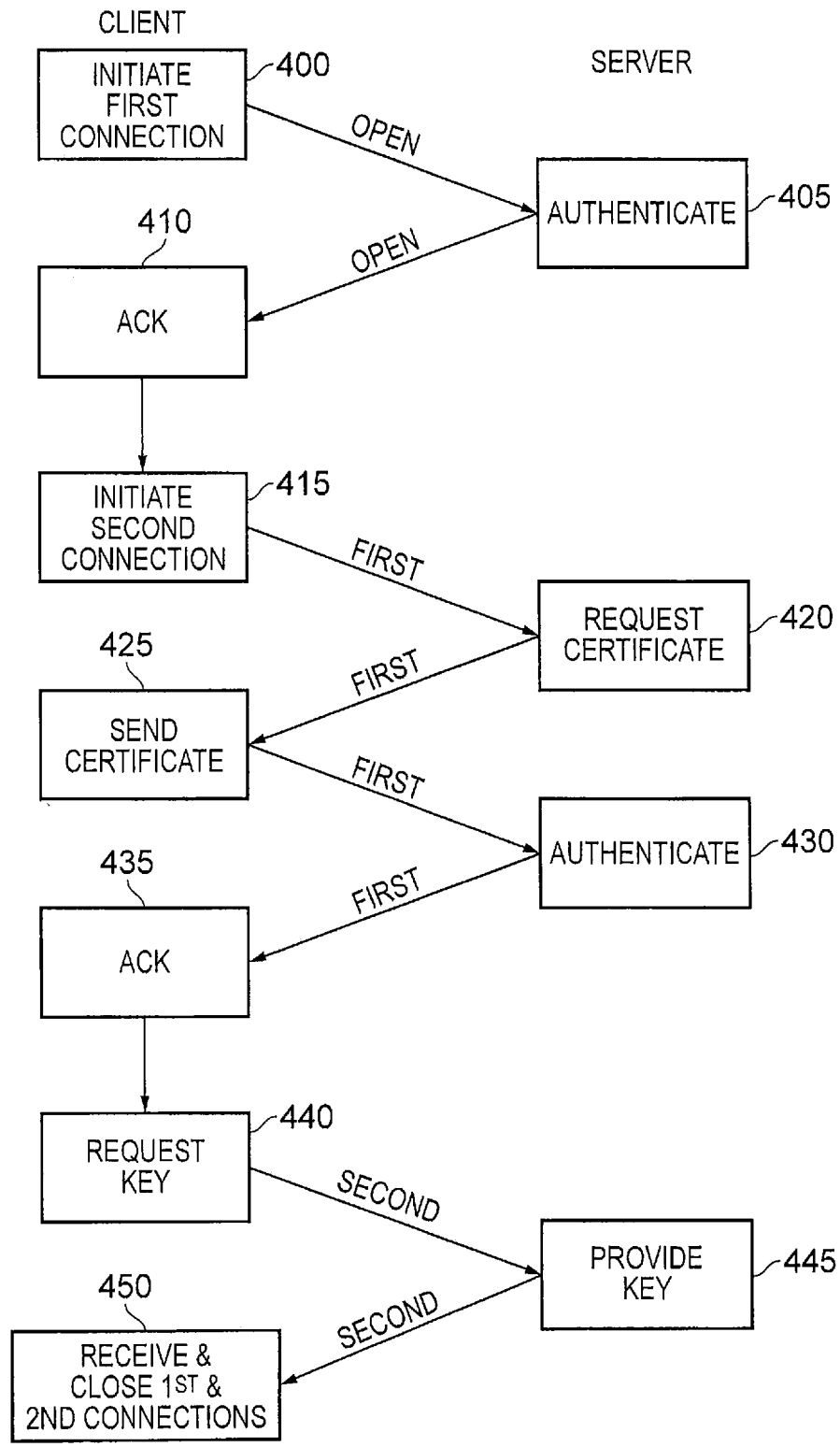
FIG. 4 is a schematic flowchart illustrating a communication process.

FIG. 4 is a schematic flowchart illustrating a communication process which addresses these issues.

Referring to FIG. 4, as an overview the process involves the server communication circuitry of the server device establishing a server-authenticated first encrypted data path between the client device and the server device. The client communication circuitry of the client device provides client-specific information (such as the client certificate) to the server device using this first encrypted data path. The server communication circuitry then uses the client-specific information provided by the client device to establish a second encrypted data path between the server device and the client device, the second encrypted data path being authenticated by at least the client device (in other words, the second encrypted data path may be a client-authenticated secure data path or a mutually authenticated secure data path). The arrangement allows a data path authenticated by at least the client device to be established without the need to exchange client-specific information over an insecure data path, thereby alleviating the privacy concerns discussed above. In examples, the second encrypted data path can be used to exchange information such as a decryption key. However, other examples are possible and will be discussed further below.

Referring to FIG. 4, once again, operations by the client device are shown at the left side of the flowchart and operations by the server device are shown at the right side of the flowchart. Annotations written next to the arrows connecting successive steps indicate the security of the data path which may be used to carry out the particular communication referred to by that arrow.

At a step 400, the client device initiates a first connection or data path to be established between the client device and the server device, for example by sending an initiation message over an open (non-secured) data link to the server device. At a step 405, the server carries out server authentication as part of the TLS process to establish the first encrypted data path between the client device and the server device, being in this example a server-authenticated data path. At a step 410, the client device acknowledges the creation of the server authenticated first encrypted data path.

Communication between the client device and the server device in respect of establishing the second (client-authenticated or mutually authenticated) encrypted data path is then carried out using the first encrypted data path. At a step 415, the client device initiates a second connection, forming the initiation of the second encrypted data path and at a step 420 the server device requests a client certificate for use in client authentication. The client device sends the client certificate (as an example of client-specific information) at a step 425. As discussed earlier, this transmission is carried out using the first encrypted data path. At a step 430, the server performs authentication to establish the second encrypted data path and the client device acknowledges this at a step 435.

Further communication is then carried out using the second encrypted data path. At a step 440, the client device requests a decryption key (similar to the step 350 discussed above) and at a step 445 the server device provides a decryption key (similar to the step 360 discussed above) which is sent to the client device over the second encrypted data path. Then at a step 450 the client device receives the decryption key and closes the first and second encrypted data paths. Note that—alternatively—the first encrypted data path could have been closed at the step 435 or 440 discussed above. Control then continues to the step 370 of FIG. 3.

Further example arrangements will now be described. First, as background, some further detail of example implementations of the steps 400, 415 of FIG. 4 will be discussed. In these arrangements, the client device is configured to send a connection initiation message (or more than one connection initiation message) to the server device in order to initiate the establishment of a data path. Similarly the server communication circuitry of the server device is configured to establish the first encrypted data path and the second encrypted data path in response to respective ones of the connection initiation messages sent by the client device to the server device. For example, in the TLS system, a so-called TLS "hello" message may be used to initiate the establishment of a secure connection. In examples, the connection initiation message indicates a server name which maps to a device with which the client device is requesting connection. For example, a so-called SNI (server name indication) field may be used within the TLS hello message to indicate the destination server with which the client device is attempting to establish secure communication. In examples to be discussed with reference to FIGS. 5 and 6, different server name indications are used in respect of the first encrypted data path and the second encrypted data path. However, these are both used to address the same server device. This arrangement can help to alleviate two potential issues, one being that the client device is not provided with access to secret information held by the server (such as a decryption key) on the basis of a server-authenticated encrypted data path alone (that is to say, without proper client identification and/or authentication). This can be alleviated by the server functionality which interacts via one server name being separated from the server functionality which provides a decryption key. Another is that the server device should be able to distinguish between requests for establishment of the first encrypted data path and requests for establishment of the second encrypted data path so that, in the context of requests for establishment of the first encrypted data path, the server device does not request client-specific information such as the client certificate from the client device. This is alleviated by the server device being able to use the server name by which it is accessed in order to distinguish between these different types of interaction.

Therefore, the process of FIG. 4 represents an example of the first encrypted data path being established before establishment of the second encrypted data path, for example before the initiation of establishment of the second encrypted data path.

FIG. 4 provides an example of a communications method comprising:

a server device establishing a server-authenticated first encrypted data path between a client device and the server device;

the client device providing client-specific information to the server device using the first encrypted data path; and the server device using the client-specific information provided by the client device to establish a second encrypted data path between the server device and the client device, the second encrypted data path being authenticated by at least the client device.

FIG. 4 provides an example of a method of operation of client device, the method comprising:

initiating establishment of a server-authenticated first encrypted data path between the client device and a server device; and providing client-specific information to the server device using the first encrypted data path to initiate establishment of a second encrypted data path between the server device and the client device, the second encrypted data path being authenticated by at least the client device.

FIG. 4 provides an example of a method of operation of a server device, the method comprising:

establishing a server-authenticated first encrypted data path between a client device and the server device;

receiving client-specific information from the client device using the first encrypted data path; and using the client-specific information provided by the client device to establish a second encrypted data path between the server device and the client device, the second encrypted data path being authenticated by at least the client device.

Figure 5:
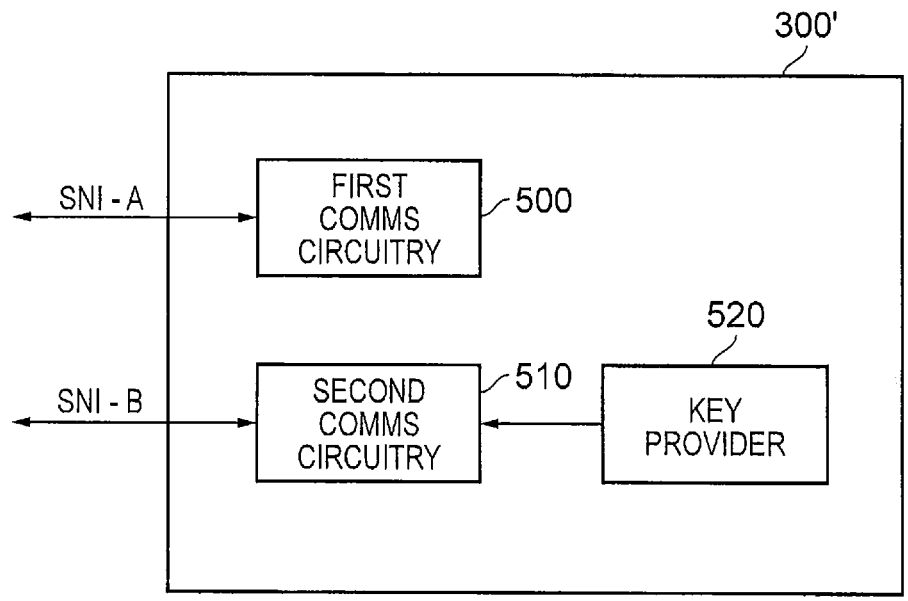
FIG. 5 schematically illustrates a server device.

Referring to FIG. 5, a part of the functionality of a server device 300' is shown, in that the server device comprises first server communication circuitry 500 which is responsive to communications initiated using the server name indication SNI-A, second communication circuitry 510 which is responsive to communications initiated using the server name indication SNI-B (different to SNI-A), with key provider circuitry 520 being associated with the second communication circuitry 510.

Figure 6:
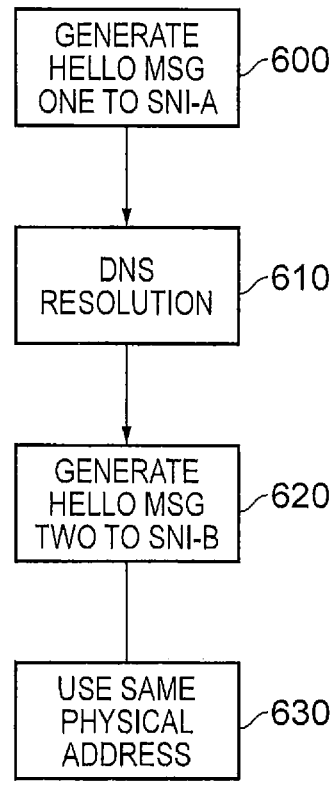
FIG. 6 is a schematic flowchart illustrating a process at a client device.

FIG. 6 is a schematic flowchart illustrating a process at a client device relating to the arrangement of FIG. 5.

At a step 600, the client device generates a TLS hello message to the server name SNI-A, corresponding to the initiation of the first connection at the step 400 in FIG. 4.

At a step 610, the client device initiates resolution of the server name under the DNS (domain name system) which involves contacting a DNS server to find a physical address such as an IP address corresponding to that server name. Processing then continues according to FIG. 4 to establish the first encrypted data path between the client device and the server device.

Turning then to the step 415 of FIG. 4, this involves the client device at a step 620 generating a further TLS hello message, this time addressed to the server name SNI-B. In this instance, however, the same physical address that was obtained at the step 610 is used. That is to say, the system does not undertake a second DNS resolution operation. This is in part to ensure that the same physical server is contacted by both of the TLS hello messages. It is noted that in some instances, load balancing or other processes carried out by DNS systems could direct accesses to a particular server name to multiple different physical destinations. By reusing the same physical address at the step 630, the situation is avoided in which the first and second hello messages, while addressed to the server names corresponding to the same logical server, are actually routed (by such load balancing or other processes) to different physical server addresses.

Therefore, as discussed above, the server device 300' is mapped to at least two server names. The server communication circuitry 500, 510 is configured to respond (by the first communication circuitry 500) to a connection initiation message indicating a first server name (in this example, SNI-A) to establish the first encrypted data path without requiring (or requesting) the client-specific information. The server communication circuitry (such as the second communication circuitry 510) is configured to respond to a connection initiation message indicating a second server name (in this example, SNI-B) to establish the second encrypted data path using the client specific information. In this way, the server communication circuitry comprises first communication circuitry 500 configured to respond to a connection initiation message indicating the first server name and second communication circuitry 510 configured to respond to a connection initiation message indicating the second server name. In the example of FIG. 5, the key provider circuitry 520 is associated only with the second communication circuitry 510 so that data accesses to the server 300' via the first communication circuitry 500 are prevented or at least inhibited from accessing the key provider circuitry 520. This is an example of access by the first communication circuitry 500 to at least parts (such as the circuitry 520) of the functionality of the server device 300' is inhibited.

Also, as discussed with reference to FIG. 6, step 610, the client device is configured to detect a server address in respect of at least the first server name. As discussed with reference to the step 630 of FIG. 6, the client device may be configured, in respect of a connection initiation message indicating the second server name, to use the server address detected in respect of the first server name (at the step 610).

Figure 7:
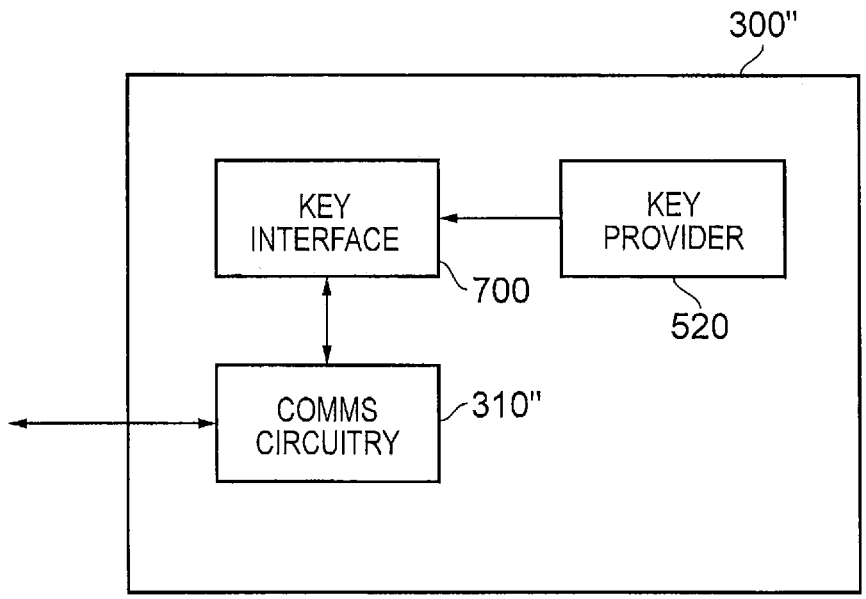
FIG. 7 schematically illustrates a server device.

Another example is shown in FIG. 7 and discussed with reference to FIG. 8. Here, a server 300" comprises communication circuitry 310", a key interface 700 and key provider circuitry 520. In this example, the server communication circuitry 310" is configured to respond to a connection initiation message (such as a TLS hello message) received from the or a client device over an unencrypted data path to establish the first encrypted data path (a server-authenticated connection). However, the communication circuitry 310" is also configured to respond to a connection initiation message received from the or a client device over an encrypted data path (such as a message received over the first encrypted data path) to establish the second encrypted data path (a client-authenticated or mutually authenticated data path). So, the communication circuitry 310" detects the type of data path being used for the TLS hello message and responds either to establish a first encrypted data path (which does not involve the server device requesting client-specific information such as the client certificate) or to establish a second encrypted data path which does involve the server device requesting the client-specific information.

Figure 8:
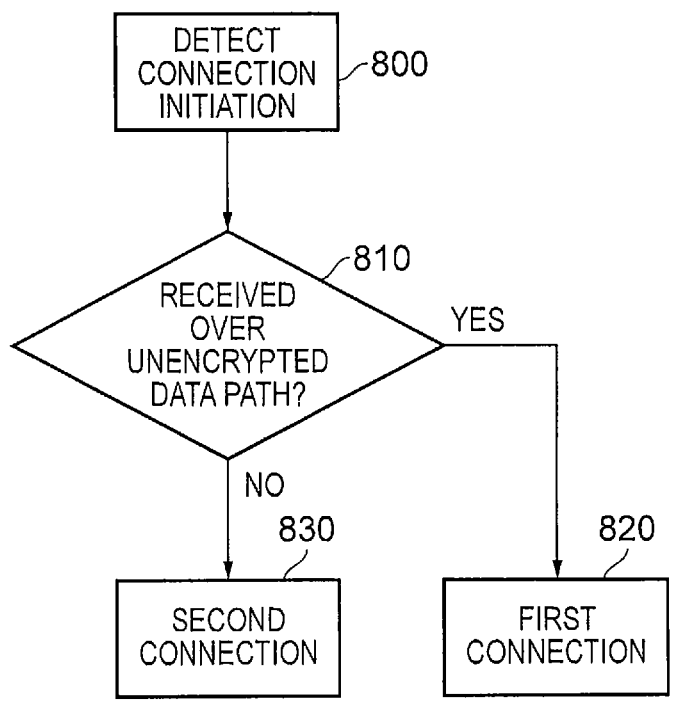
FIG. 8 is a schematic flowchart illustrating a process at a server device.

FIG. 8 provides an example of these operations by the communication circuitry 310" of the server device 300". At a step 800, the communication circuitry 310" detects the initiation of a connection, for example in the form of a TLS hello message sent by a client device. At a step 810 the communication circuitry 310" detects whether the message was received over an unencrypted data path. If the answer is yes then the server device establishes the first encrypted data path at a step 820 (corresponding to the step 405 of the flowchart of FIG. 4) and if the answer is no then the server device starts the initiation of the second encrypted data path at a step 830 corresponding to the step 420 of FIG. 4.

The key interface 700 is provided to inhibit access between the communication circuitry 310" and the key provider circuitry 520 except when a second encrypted data path is in place. Once again, this can help to maintain the security of the server device by at least inhibiting access to the key provider circuitry 520 when only a server-authenticated encrypted data path is in place.

In some examples, the client device and/or the server device can be arranged to handle appropriately an interaction with a so-called legacy device. For example, a client device operating according to the principles discussed above may need to interact with a server device which, as a matter of routine, requests client certificates or other client-specific information to be sent over an insecure data path. Similarly, a server device may need to interact with a client device which may or may not send a client certificate or other client-specific information over an insecure data path.

Figure 9:
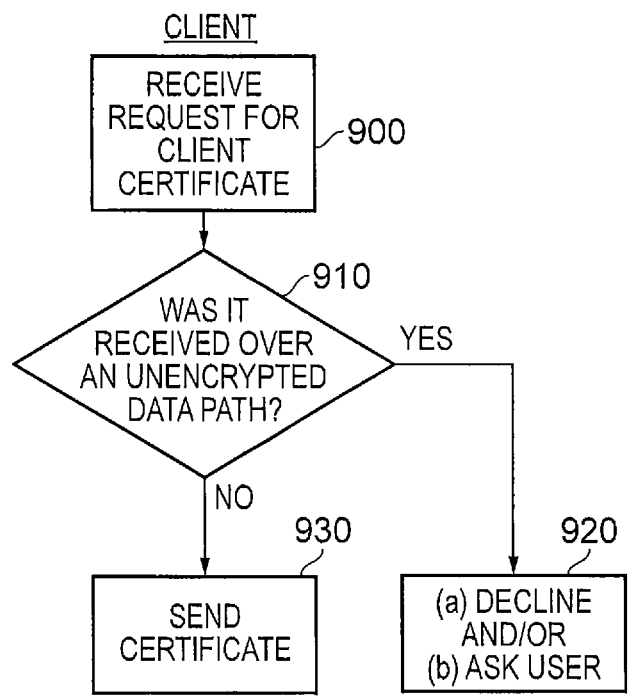
FIG. 9 is a schematic flowchart illustrating a process at a client device.

Referring to FIG. 9, which is a flowchart illustrating a process at a client device, at a step 900 the client device receives a request from a server device for client-specific information such as a client certificate. At a step 910, the client communication circuitry detects whether the request was received over an unencrypted data path. If the answer is yes then control passes to a step 920 at which either or both of the following is carried out. For example, the client device can simply decline to send the client-specific information and/or the client device can ask the user (for example by displaying a pop up display window asking this question) to detect whether the user is willing to send client-specific information over an insecure data path. If the user is not willing to do this, then the client device declines the request for the client certificate. If the answer is no at the step 910 then the client device sends the client certificate at a step 930. This provides an example of the client communication circuitry being configured to respond to a message received from a server device requesting client-specific information to be sent to the server device over an unencrypted data path to decline to send the client-specific information.

Figure 10:
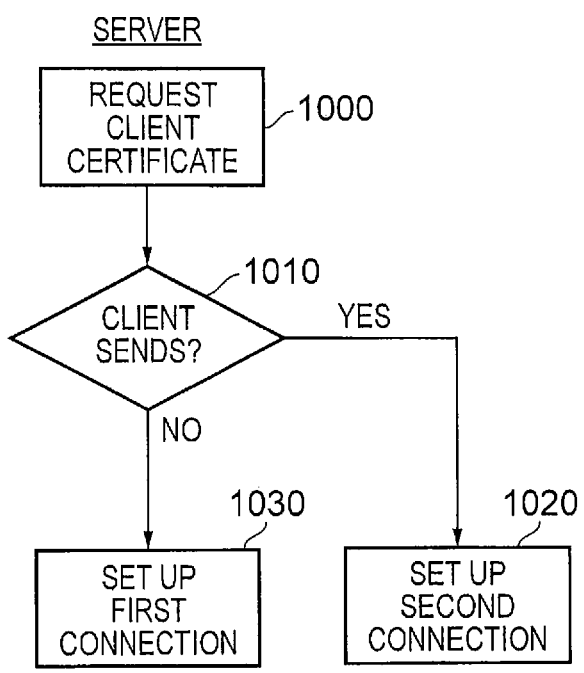
FIG. 10 is a schematic flowchart illustrating a process at a server device.

FIG. 10 is a schematic flowchart illustrating a process at a server device. At a step 1000 the server device requests a client certificate from a communicating client device. At a step 1010 the server device detects whether the client device sends the client certificate. If the answer is yes then the server device establishes the second encrypted data path in the manner discussed above, at a step 1020. If the answer is no then the server device establishes the first encrypted data path (server-authenticated) at a step 1030. This provides an example of a server device configured, in response to a client device declining to send the client-specific information, to establish the first encrypted data path.

In the examples discussed above, relating to a DRM system, the server device is configured to provide a decryption key to the client device by the second encrypted data path. In such examples, the server device can comprise content providing circuitry (for example, part of the circuitry 260) configured to provide audio and/or visual content to the client device. The client device can comprise content decryption circuitry (for example, part of the functionality of the functional unit 260 and/or the CPU 210 under software control) configured to decrypt the encrypted audio and/or visual content using the decryption key provided by the server device.

However, other example arrangements are possible, such that the server device and the client device do not have to relate to the exchange of DRM or other content. For example, the client device can be a data providing device which provides data to the server device. An example is a detector device such as a utilities meter, a temperature controller or the like. In such arrangements, the first encrypted data path can be used to exchange client-specific information relating to that client device. Other examples could be:

Access control devices or systems for example permitting access through doors or barriers or allowing presence in a controlled space such as a reserved location (for example a vehicle in a bus lane, car park; VIP enclosure at an event, control of airborne drone devices in an defined space)

Devices and systems sending, requesting or exchanging operating instructions, directions or rules Devices and systems sending, requesting or exchanging metadata, for example for relaying metadata to a so-called "big-data" collection or database for example from which statistics and trends can be gleaned.

Devices and systems sending, requesting or exchanging data on which billing for data or services is based Devices and systems sending, requesting or exchanging diagnostic, condition monitoring or status or fault data Devices and systems sending, requesting or exchanging summaries of audio or video or still image data such as feature vectors, hashed data generated by hash algorithms or other summaries or compressed representations of audio or video or still images.

Devices sending, requesting or exchanging data or requests used for pairing two devices.

Devices and systems sending, requesting or exchanging data or requests used identifying the location of a device, whether indoors or outdoors.

Devices and systems sending, requesting or exchanging data or requests used in taking control of autonomous devices such as robots or drones, for example in emergency situations or situations where security is threatened.

Devices and systems sending, requesting or exchanging information which is an input to a machine learning algorithm operating on a computer.

As such, the device and system claimed may be embodied in a vehicle or camera sensor module or device with a camera sensor for sending video or still image data or data derived therefrom. Combinations of the above are also within scope of the disclosure. As discussed above, in various examples the first encrypted data path can be a server-authenticated TLS data path and the second encrypted data path can be selected from the group consisting of: (i) a client authenticated TLS data path; and (ii) a mutually authenticated TLS data path.

Features of embodiments of the disclosure are defined by the following numbered clauses:

1. A communications system comprising:
    a client device; and
    a server device;
    the server device comprising server communication circuitry configured to establish a server-authenticated first encrypted data path between the client device and the server device; and
    the client device comprising client communication circuitry configured to provide client-specific information to the server device using the first encrypted data path;
    the server communication circuitry being configured to use the client-specific information provided by the client device to establish a second encrypted data path between the server device and the client device, the second encrypted data path being authenticated by at least the client device.

2. A system according to clause 1, in which the server communication circuitry is configured to establish the first encrypted data path and the second encrypted data path in response to respective connection initiation messages sent by the client device to the server device.

3. A system according to clause 2, in which the connection initiation messages each comprise an indication of a server name mapping to a device with which the client device is requesting connection.

4. A system according to clause 3, in which:
    the server device is mapped to at least two server names;
    the server communication circuitry being configured to respond to a connection initiation message indicating a first server name to establish the first encrypted data path without requiring the client-specific information; and
    the server communication circuitry being configured to respond to a connection initiation message indicating a second server name to establish the second encrypted data path using the client-specific information.

5. A system according to clause 4, in which:
    the server communication circuitry comprises first communication circuitry configured to respond to a connection initiation message indicating the first server name and second communication circuitry configured to respond to a connection initiation message indicating the second server name, in which access by the first communication circuitry to at least parts of the functionality of the server device is inhibited.

6. A system according to clause 4 or clause 5, in which the client device is configured to detect a server address in respect of at least the first server name.

7. A system according to clause 6, in which the client device is configured, in respect of a connection initiation message indicating the second server name, to use the server address detected in respect of the first server name.

8. A system according to clause 1 or clause 2, in which the server communication circuitry is configured to respond to a connection initiation message received from the client device over an unencrypted data path to establish the first encrypted data path, and to respond to a connection initiation message received from the client device over an encrypted data path to establish the second encrypted data path.

9. A system according to clause 1 or clause 2, in which the client communication circuitry is configured to respond to a message received from a server device requesting client-specific information to be sent to the server device over an unencrypted data path to decline to send the client-specific information.

10. A system according to clause 9, in which the server device is configured, in response to a client device declining to send the client-specific information, to establish the first encrypted data path.

11. A system according to any one of the preceding clauses, in which the server device is configured to provide a decryption key to the client device by the second encrypted data path.

12. A system according to clause 11, in which:
the server device comprises content providing circuitry configured to provide encrypted audio and/or visual content to the client device; and
the client device comprises content decryption circuitry configured to decrypt the encrypted audio and/or visual content using the decryption key.

13. A system according to any one of clauses 1 to 10, in which the client device is a data providing device which provides data to the server device.

14. A system according to any one of the preceding clauses, in which:
the first encrypted data path is a server-authenticated transport level security (TLS) data path; and
the second encrypted data path is selected from the group consisting of: (i) a client-authenticated transport level security (TLS) data path; and (ii) a mutually-authenticated transport level security (TLS) data path.

15. A system according to any one of the preceding clauses, in which the first encrypted data path is established before establishment of the second encrypted data path.

16. A client device configured to communicate with a server device, the client device comprising:
communication circuitry configured to initiate establishment of a server-authenticated first encrypted data path between the client device and the server device to provide client-specific information to the server device using the first encrypted data path to initiate establishment of a second encrypted data path between the server device and the client device, the second encrypted data path being authenticated by at least the client device.

17. A client device according to clause 16, in which the communication circuitry is configured to respond to a message received from a server device requesting client-specific information to be sent to the server device over an unencrypted data path to decline to send the client-specific information.

18. A client device according to clause 16 or clause 17, in which the communication circuitry is configured to respond to a message received from a server device requesting client-specific information to be sent to the server device over an unencrypted data path to display a message requesting user permission to send the client-specific information over the unencrypted data path.

19. A client device according to any one of clauses 16 to 18, in which the communication circuitry is configured to establish the first encrypted data path and the second encrypted data path by sending respective connection initiation messages to the server device.

20. A system according to clause 19, in which the connection initiation messages each comprise an indication of a server name mapping to a device with which the client device is requesting connection.

21. A client device according to clause 20, in which:
the server device is mapped to at least two server names;
the communication circuitry is configured to send a connection initiation message indicating a first server name to establish the first encrypted data path; and
the communication circuitry is configured to send a connection initiation message indicating a second server name to establish the second encrypted data path.

22. A server device configured to communicate with a client device, the server device comprising:
communication circuitry configured to establish a server-authenticated first encrypted data path between the client device and the server device, and to receive client-specific information from the client device using the first encrypted data path;
the communication circuitry being configured to use the client-specific information provided by the client device to establish a second encrypted data path between the server device and the client device, the second encrypted data path being authenticated by at least the client device.

23. A communications method comprising:
a server device establishing a server-authenticated first encrypted data path between a client device and the server device;
the client device providing client-specific information to the server device using the first encrypted data path; and
the server device using the client-specific information provided by the client device to establish a second encrypted data path between the server device and the client device, the second encrypted data path being authenticated by at least the client device.

24. A method of operation of client device, the method comprising:
initiating establishment of a server-authenticated first encrypted data path between the client device and a server device; and
providing client-specific information to the server device using the first encrypted data path to initiate establishment of a second encrypted data path between the server device and the client device, the second encrypted data path being authenticated by at least the client device.

25. A method of operation of a server device, the method comprising:
establishing a server-authenticated first encrypted data path between a client device and the server device;
receiving client-specific information from the client device using the first encrypted data path; and
using the client-specific information provided by the client device to establish a second encrypted data path between the server device and the client device, the second encrypted data path being authenticated by at least the client device.

26. Computer software which, when executed by a computer, causes the computer to perform the method of any one of clauses 23 to 25.

Where methods of processing, coding or decoding are discussed above, it will be appreciated that apparatus configured to perform such methods are also considered to represent embodiments of the disclosure. It will also be appreciated that video storage, transmission, capture and/or display apparatus incorporating such techniques is considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be apparent that numerous modifications and variations of the present disclosure are possible in light of the above teachings. It is therefore to be understood that within the scope of the appended claims, the technology may be practiced otherwise than as specifically described herein.

The invention claimed is:

1. A communications system comprising:
   a client device; and
   a server device;
   the server device comprising server communication circuitry configured to establish a server-authenticated first encrypted data path between the client device and the server device; and
   the client device comprising client communication circuitry configured to provide client-specific information to the server device using the first encrypted data path;
   the server communication circuitry being configured to use the client-specific information provided by the client device to establish a second encrypted data path between the server device and the client device, the second encrypted data path being authenticated by at least the client device,
   wherein the server communication circuitry is configured to establish the first encrypted data path and the second encrypted data path in response to respective connection initiation messages sent by the client device to the server device,
   the connection initiation messages each comprise an indication of a server name mapping to a device with which the client device is requesting connection,
   the server device is mapped to at least two server names,
   the server communication circuitry is configured to respond to a connection initiation message indicating a first server name to establish the first encrypted data path without requiring the client-specific information, and
   the server communication circuitry is configured to respond to a connection initiation message indicating a second server name to establish the second encrypted data path using the client-specific information.

2. The system according to claim 1, wherein
   the server communication circuitry comprises first communication circuitry configured to respond to a connection initiation message indicating the first server name and second communication circuitry configured to respond to a connection initiation message indicating the second server name, in which access by the first communication circuitry to at least parts of the functionality of the server device is inhibited.

3. The system according to claim 1, wherein the client device is configured to detect a server address in respect of at least the first server name.

4. The system according to claim 3, wherein the client device is configured, in respect of a connection initiation message indicating the second server name, to use the server address detected in respect of the first server name.

5. The system according to claim 1, wherein the server communication circuitry is configured to respond to a connection initiation message received from the client device over an unencrypted data path to establish the first encrypted data path, and to respond to a connection initiation message received from the client device over an encrypted data path to establish the second encrypted data path.

6. The system according to claim 1, wherein the client communication circuitry is configured to respond to a message received from a server device requesting client-specific information to be sent to the server device over an unencrypted data path to decline to send the client-specific information.

7. The system according to claim 1, wherein the server device is configured to provide a decryption key to the client device by the second encrypted data path.

8. The system according to claim 7, wherein:
   the server device comprises content providing circuitry configured to provide encrypted audio and/or visual content to the client device; and
   the client device comprises content decryption circuitry configured to decrypt the encrypted audio and/or visual content using the decryption key.

9. The system according to claim 1, wherein:
   the first encrypted data path is a server-authenticated transport level security (TLS) data path; and
   the second encrypted data path is selected from the group consisting of: (i) a client-authenticated transport level security (TLS) data path; and (ii) a mutually-authenticated transport level security (TLS) data path.

10. A client device configured to communicate with a server device, the client device comprising:
    communication circuitry configured to initiate establishment of an authenticated first encrypted data path between the client device and the server device, and provide client-specific information to the server device using the first encrypted data path to initiate establishment of a second encrypted data path between the server device and the client device, the second encrypted data path being authenticated by at least the client device,
    wherein the communication circuitry is configured to establish the first encrypted data path and the second encrypted data path by sending respective connection initiation messages to the server device,
    the connection initiation messages each comprise an indication of a server name mapping to a device with which the client device is requesting connection,
    the server device is mapped to at least two server names, the communication circuitry is configured to send a connection initiation message indicating a first server name to establish the first encrypted data path, and the communication circuitry is configured to send a connection initiation message indicating a second server name to establish the second encrypted data path.

11. The client device according to claim 10, in which the communication circuitry is configured to respond to a message received from a server device requesting client-specific information to be sent to the server device over an unencrypted data path to decline to send the client-specific information.

12. The client device according to claim 10, in which the communication circuitry is configured to respond to a message received from a server device requesting client-specific information to be sent to the server device over an unencrypted data path to display a message requesting user permission to send the client-specific information over the unencrypted data path.

13. A server device configured to communicate with a client device, the server device comprising:

communication circuitry configured to establish a server-authenticated first encrypted data path between the client device and the server device, and to receive client-specific information from the client device using the first encrypted data path;

the communication circuitry being configured to use the client-specific information provided by the client device to establish a second encrypted data path between the server device and the client device, the second encrypted data path being authenticated by at least the client device, wherein communication circuitry is configured to establish the first encrypted data path and the second encrypted data path in response to respective connection initiation messages sent by the client device to the server device, the connection initiation messages each comprise an indication of a server name mapping to a device with which the client device is requesting connection, the server device is mapped to at least two server names, the communication circuitry is configured to respond to a connection initiation message indicating a first server name to establish the first encrypted data path without requiring the client-specific information, and the communication circuitry is configured to respond to a connection initiation message indicating a second server name to establish the second encrypted data path using the client-specific information.

14. A method of operation of client device, the method comprising:

initiating, by circuitry, establishment of a server-authenticated first encrypted data path between the client device and a server device; and providing client-specific information to the server device using the first encrypted data path to initiate establishment of a second encrypted data path between the server device and the client device, the second encrypted data path being authenticated by at least the client device, wherein the first encrypted data path and the second encrypted data path are established by sending respective connection initiation messages to the server device, the connection initiation messages each comprise an indication of a server name mapping to a device with which the client device is requesting connection, the server device is mapped to at least two server names, a connection initiation message indicating a first server name is sent to establish the first encrypted data path, and a connection initiation message indicating a second server name is sent to establish the second encrypted data path.

* * * * *